No. 797,899. PATENTED AUG. 22, 1905.
M. LEITCH.
CAN SOLDERING AND SURPLUS SOLDER REMOVING MACHINE.
APPLICATION FILED SEPT. 12, 1904.
2 SHEETS—SHEET 1.
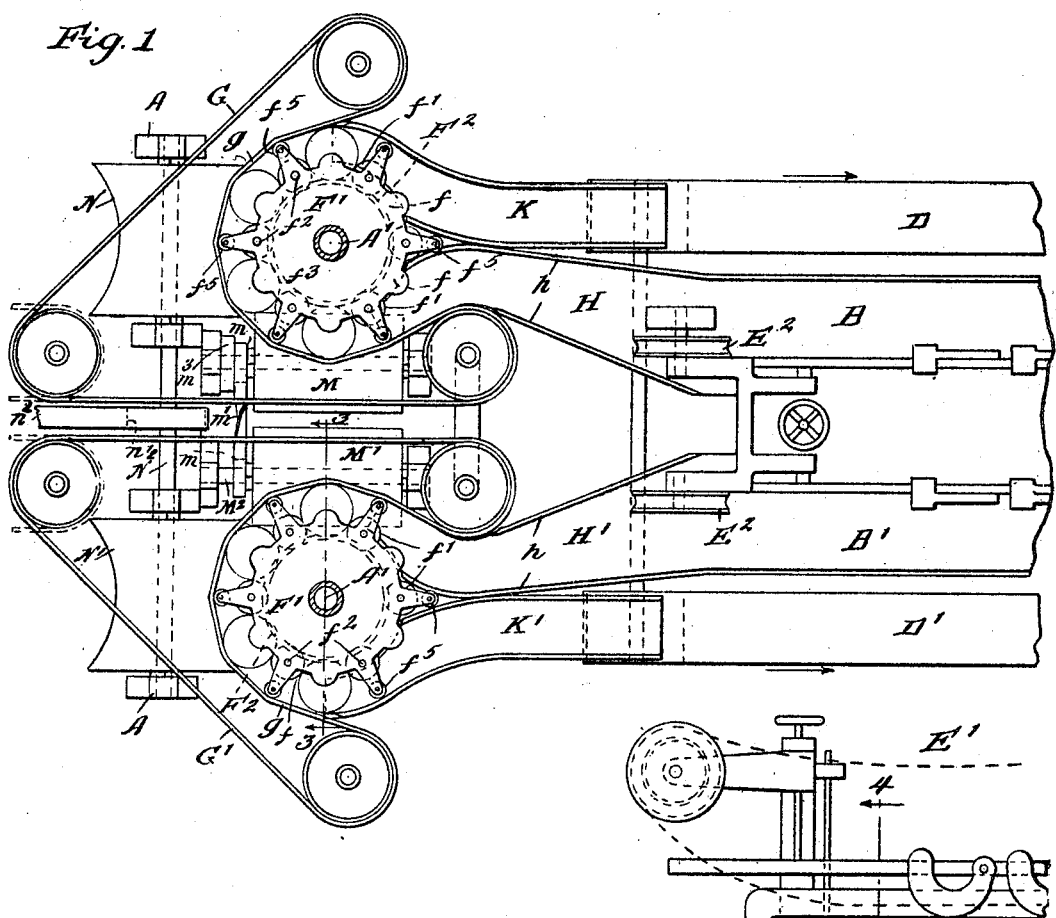
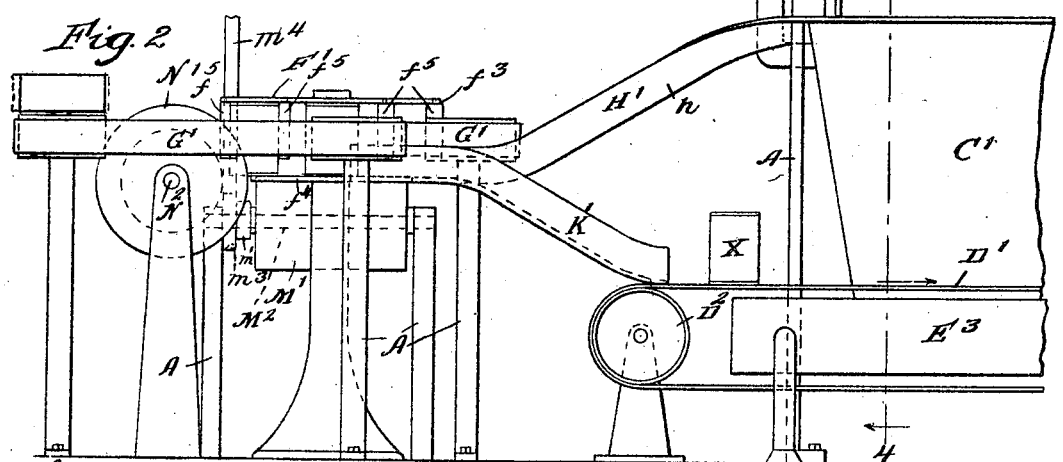
Witnesses:
Wm. Geiger
Inventor:
Meredith Leitch
By Munday, Evarts & Adcock
Attorneys No. 797,899. PATENTED AUG. 22, 1905.
M. LEITCH.
CAN SOLDERING AND SURPLUS SOLDER REMOVING MACHINE.
APPLICATION FILED SEPT. 12, 1904.
2 SHEETS—SHEET 2.
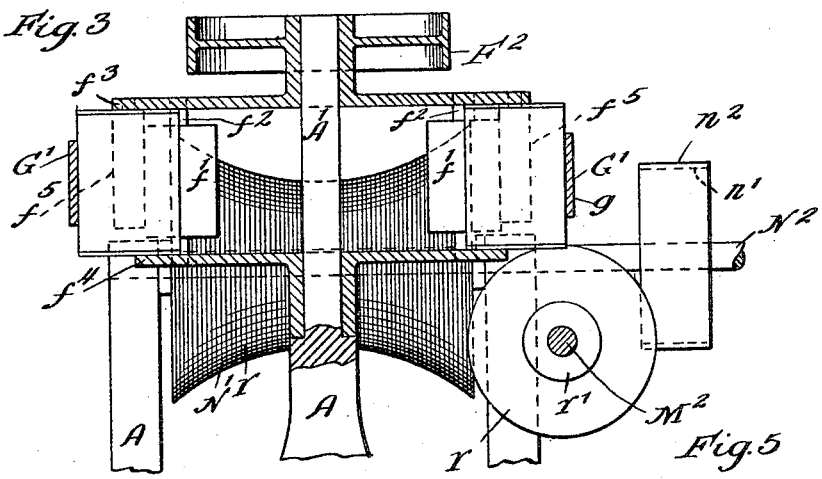
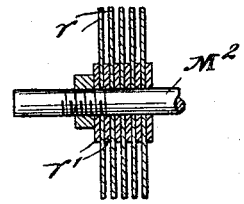
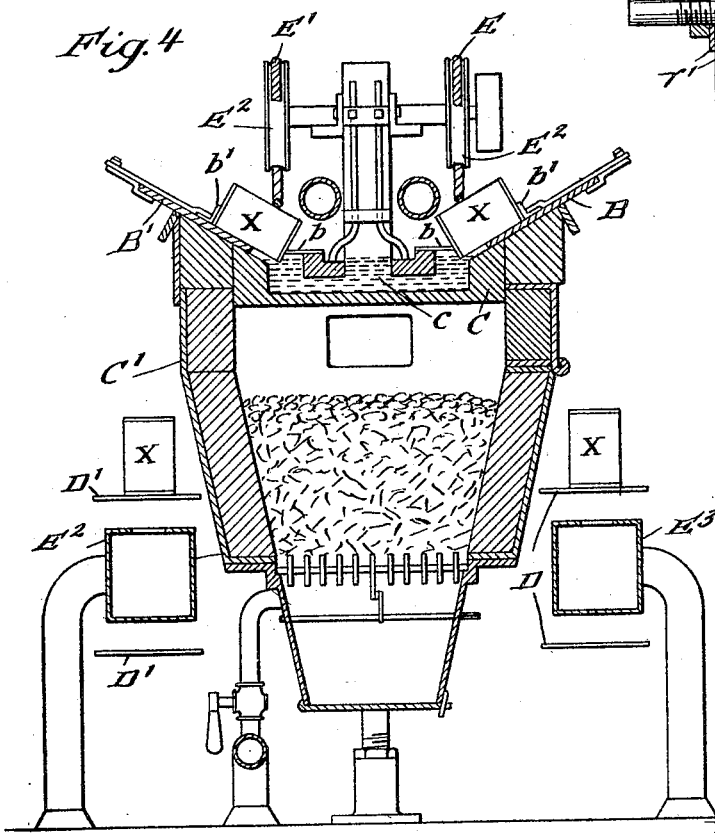
Witnesses:
Wm. Geiger
A. M. Munday
Inventor
Meredith Leitch
By Munday, Evarts & Adcock
Attorneys

UNITED STATES PATENT OFFICE.

MEREDITH LEITCH, OF NEW YORK, N. Y., ASSIGNOR TO AMERICAN CAN COMPANY, OF NEW YORK, N. Y., A CORPORATION OF NEW JERSEY.

CAN-SOLDERING AND SURPLUS-SOLDER-REMOVING MACHINE.

No. 797,899.　　　　Specification of Letters Patent.　　　　Patented Aug. 22, 1905.

Application filed September 12, 1904. Serial No. 224,055.

*To all whom it may concern:*

Be it known that I, MEREDITH LEITCH, a citizen of the United States, residing in the borough of Brooklyn, in the county of Kings, city and State of New York, have invented a new and useful Improvement in Can-Soldering and Surplus-Solder-Removing Machines, of which the following is a specification.

My invention relates to improvements in machines for soldering the end seams of sheet-metal cans and removing surplus solder therefrom, and more particularly to improvements in machines of the kind or class wherein the end seams of the cans are soldered by rolling the cans along a runway or track first through or in contact with a flux bath or device and then through a solder bath or device, two runways being employed, one for soldering one end of the can and the other for soldering the other end thereof.

The object of my invention is to provide a machine or mechanism of a simple, efficient, and durable construction by means of which after the end seams of the cans have been soldered in the usual way by rolling them in an inclined position through a solder-bath the surplus solder may be removed before it becomes set or cooled from the outside surface or corners of the cans which were immersed in the molten solder in the soldering operation and by which such outside corner surface of the can may be polished and its original tin luster restored without scratching or injury or removing the tin coating or in any way interfering with the perfection of the soldered joint and by which this work may be done rapidly and cheaply.

In practicing my invention I prefer to employ a can-end-soldering machine of the kind shown and described in the Hodgson and Taliaferro patent, No. 704,257, of July 8, 1902, and comprising, essentially, a flux bath or device, a solder bath or device, a pair of transversely-inclined runways, means for rolling the cans along the runways, a pair of cooling-belts, and means for delivering the cans from one cooling-belt after one end thereof has been soldered to the other runway for soldering the other end seam of the can, and I have therefore shown in the accompanying drawings, forming a part of this specification, that end or portion of said Hodgson and Taliaferro patent soldering-machine with which my improved mechanism for removing surplus solder directly connects and coöperates.

My invention consists, in connection with the solder-bath, transversely-inclined runways, endless chains or devices for rolling the cans along the runways, and the cooling-belts, of a pair of continuously-rotating turrets having pockets and antifriction-rollers to receive the cans and permit the same to rotate while being carried around by the turrets, a pair of endless belts each having a run or loop partially surrounding one of the turrets for causing the cans to rotate on their axes as they are carried around by the turrets, longitudinally-inclined chutes or runways for delivering the cans to the turrets, chutes or runways for delivering the cans from the turrets to the cooling-belts, and rapidly-rotating soft cylindrical buffers mounted on the stationary frame of the machine and engaging the flat or disk surface of the can-heads as the rotating cans are carried around by the turrets to remove the surplus solder by a buffing action from the flat or disk surface of the can-heads, and rapidly-rotating buffers having curved peripheries corresponding to the path of the cans on the turrets and engaging the cylindrical surfaces of the can-head flanges and of the can-bodies adjacent thereto to remove surplus solder from such surfaces as the cans are rotated and carried around by the turrets.

My invention also consists in the novel construction of parts and devices and in the novel combinations of parts and devices herein shown or described.

In the accompanying drawings, forming a part of this specification, Figure 1 is a plan view of a mechanism embodying my invention, showing that portion of the soldering-machine to which my improvement directly connects and coöperates. Fig. 2 is a side elevation. Fig. 3 is a detail vertical section on line 3 3 of Fig. 1. Fig. 4 is a vertical section on line 4 4 of Fig. 2, and Fig. 5 is a detail partial sectional view of one of the rotary buffers.

In the drawings, A represents the frame of the machine.

B B' are the transversely-inclined tracks or runways, along which the cans are rolled through the molten solder *c* in the solder bath or vessel C. Each of the can-runways B B' has a lower guide *b* for the lower end of the rolling cans to bear against and an upper guide $b'$.

$C'$ is a heater, preferably a coal-burning furnace, for keeping the solder $c$ molten.

D D' are the cooling-belts traveling on horizontal pulleys $D^2$, by which the cans are held and conveyed in an upright position after the soldering and solder-removing operations on each end thereof.

E E' are endless conveyers or chains traveling on pulleys $E^2$ for rolling the cans along the runways B B'.

$E^2 E^3$ are compressed-air trunks or conductors by which air is projected against the cans on the cooling-belts to aid in cooling the cans.

F F' are horizontally-rotating turrets mounted on upright standards $A'$ of the frame and furnished with driving-pulleys $F^2$ for rotating the same. Each of these turrets F F' is furnished with a series of can-pockets $f$ and antifriction-rollers $f'$, having upright shafts $f^2$ extending between the upper and lower disks or plates $f^3 f^4$ of the turret. Each of the turrets is also preferably provided with belt-rollers or pulleys $f^5$.

G G' are endless belts traveling on pulleys $G^2$ and each having a run or loop $g$ partially surrounding the turret and contacting with the cans thereof or in the pockets thereof to cause the cans to rotate each on its own axis as the turret revolves.

H H' are longitudinally-inclined and transversely-twisted chutes or runways for delivering the cans from the runways B B' onto the turrets F F', respectively. Each of the runways H H' is furnished with side guides $h$ to direct the cans into the pockets of the turrets as the turrets rotate continuously. The endless belts G G' also coöperate with the runways H H' and the side guides $h$ thereof to aid in delivering the cans into the turrets.

K K' are longitudinally-inclined chutes for delivering the cans from the turrets F F' to the cooling-belts D D', respectively, after the surplus solder has been removed from the outside surface of the can-heads and can-bodies at the corners of the cans.

M M' are rapidly-rotating soft cylindrical buffers adapted to engage the flat or disk surface of the can-heads as the cans are rotated on their axes and carried around by the turret, and N N' are rapidly-rotating soft buffers having curved peripheries corresponding to the curvature of the path of the cans as they are carried around by the turrets and engaging the outside cylindrical surface of the can-head flanges and of the can-bodies adjacent thereto to remove the surplus solder from such surface of the cans as the cans are rotated and carried around by the turrets. Each of the rotary buffers M M' N N' is preferably composed of a series of light thin soft flexible textile circular disks $r$, clamped together on the shafts of the buffers with interposed washers or disks $r'$ of smaller diameter.

The shafts $M^2$ of the rotary buffers M M' are furnished with pulleys $m$, and motion is communicated from the one to the other by a crossing belt $m'$, and these two rotary buffers are driven at the required high speed to produce a buffing action on the molten-solder-coated surface of the cans by a pulley $m^3$ on the shaft of one of the buffers through a belt $m^4$ from any suitable driving-pulley.

The rotary buffers N N' are preferably both mounted on the same driving-shaft $N^2$, which is furnished with a pulley $n'$ and driven by a belt $n^2$ at the required high speed to produce a buffing action on the cans.

I claim—

1. The combination with a solder-bath of two transversely-inclined runways for the cans, means for rolling the cans along said runways, two cooling-belts, two rotating turrets each furnished with pockets and antifriction-rollers to receive the cans, two endless belts each having a run partially surrounding one of said turrets to rotate the cans, two rotary cylindrical buffers engaging the flat or disk surface of the can-heads as the cans are carried around by said turrets, two rotary buffers having curved surfaces to engage the outside cylindric surface of the can-seams as the cans are rotated and carried around by the turrets, longitudinally-inclined runways for delivering the cans to the turrets, and chutes for delivering the cans from the runways to the cooling-belts, substantially as specified.

2. The combination with a solder-bath, transversely-inclined runways for the cans, means for rolling the cans along the runways, rotating can-carrying turrets having pockets to receive the cans automatically as they roll along the runways, means for rotating the cans as they are carried around by the turrets, rotary cylindrical buffers engaging the can-heads, and rotary buffers engaging the can-head flanges and can-bodies, substantially as specified.

3. The combination with a solder-bath, transversely-inclined runways for the cans, means for rolling the cans along the runways, rotating can-carrying turrets having pockets to receive the cans automatically as they roll along the runways, means for rotating the cans as they are carried around by the turrets, rotary cylindrical buffers engaging the can-heads, rotary buffers engaging the can-head flanges and can-bodies, and inclined runways for delivering the cans to the turrets, substantially as specified.

4. The combination with the solder-bath, transversely-inclined runways for the cans, means for rolling the cans along the runways, rotating can-carrying turrets having pockets to automatically receive the cans from inclined can-delivery runways, inclined runways for delivering the cans to the turrets, cooling-belts, and chutes for delivering the cans from the turrets to the cooling-belts, substantially as specified.

5. The combination with a solder-bath, of a runway for the cans, means for rolling the cans along the runway, a rotating can-carrying turret, means for rotating the cans on the turret, an inclined chute or runway for delivering the cans to the turret, said turret having pockets to automatically receive the cans as they roll along said inclined chute or runway and a rotary cylindrical buffer for removing surplus solder substantially as specified.

6. The combination with a solder-bath, of a runway for the cans, means for rolling the cans along the runway, a rotating can-carrying turret, means for rotating the cans on the turret, an inclined chute or runway for delivering the cans to the turret, said turret having pockets to automatically receive the cans from said inclined chute or runway as they roll along the same two rotary buffers, one engaging the flat or disk surface of the can-head and the other the cylindrical surface of the can-head flange and body to remove surplus solder therefrom, substantially as specified.

7. The combination with a solder-bath, of a runway for the cans, means for rolling the cans along the runway, a rotating can-carrying turret, means for rotating the cans on the turret, an inclined chute or runway for delivering the cans to the turret, said turret having pockets to automatically receive the cans from said inclined chute or runway as they roll along the same a rotary cylindrical buffer engaging the flat or disk surface of the can-head, and a rotary buffer having a curved periphery engaging the cylindrical surface of the can head and body as the cans are carried around and rotated by the turret, substantially as specified.

8. The combination of a solder-bath, with runway for the cans, means for rolling the cans along the runway, a cooling-belt, a rotating can-carrying turret, means for rotating the cans on the turret, a rotary buffer, an inclined chute or runway to the turret, said turret having pockets to automatically receive the cans from said inclined chute or runway as they roll along the same and a chute for delivering the cans from the turret to the cooling-belt, substantially as specified.

9. The combination with a solder-bath, of a runway for the cans, means for rolling the cans along the runway, a cooling-belt, a rotating can-carrying turret, means for rotating the cans on the turret, a runway for delivering the cans to the turret, said turret having pockets to automatically receive the cans from said inclined chute or runway as they roll along the same a chute for delivering the cans from the turret to the cooling-belt, and two rotary buffers engaging the corner surface of the cans, substantially as specified.

10. The combination with a solder-bath, of a runway for the cans, means for rolling the cans along the runway, a cooling-belt, a rotating can-carrying turret, means for rotating the cans on the turret, a runway for delivering the cans to the turret, said turret having pockets to automatically receive the cans from said inclined chute or runway as they roll along the same a chute for delivering the cans from the turret to the cooling-belt, a rotary cylindrical buffer engaging the head-surface of the can, and a rotary buffer engaging the cylindrical surface of the can as the cans are carried around and rotated by the turret, substantially as specified.

11. The combination with a solder-bath, of a runway for the cans, means for rolling the cans along the runway, a cooling-belt, a rotating can-carrying turret, means for rotating the cans on the turret, a runway for delivering the cans to the turret, a chute for delivering the cans from the turret to the cooling-belt, a rotary cylindrical buffer engaging the head-surface of the can, and a rotary buffer engaging the cylindrical surface of the can as the cans are carried around and rotated by the turret, said last-mentioned buffer having a curved periphery corresponding to the curved path of the cans as they are carried around by the turret, substantially as specified.

12. The combination with a solder-bath, of a runway for the cans, means for rolling the cans along the runway, a rotating can-carrying turret having antifriction-rollers engaging the cans, an endless belt having a run partially surrounding the turret to rotate the cans, an inclined chute or runway for delivering the cans to the turret, and a rotary cylindrical buffer for removing surplus solder from the cans, substantially as specified.

13. The combination with a solder-bath, of a runway for the cans, means for rolling the cans along the runway, a rotating can-carrying turret having antifriction-rollers engaging the cans, an endless belt having a run partially surrounding the turret to rotate the cans, an inclined chute or runway for delivering the cans to the turret, a rotary cylindrical buffer for removing surplus solder from the cans, a cooling-belt, and a chute for delivering the cans from the turret to the cooling-belt, substantially as specified.

14. In a can-end-soldering and surplus-solder-removing machine, the combination with a soldering mechanism, of a horizontally-rotating turret furnished with antifriction-roller pockets in its periphery to receive the cans, and an endless-belt conveyer having a looped run partly surrounding said turret for rotating the cans as the turret revolves, and rotating buffers engaging the freshly-soldered seams of the cans as the cans rotate, substantially as specified.

15. In a can-end-soldering and surplus-solder-removing machine, the combination with a soldering mechanism, of a horizontally-rotating turret furnished with antifriction-roller pockets in its periphery to receive the cans, and an endless-belt conveyer having a looped run partly surrounding said turret for rotating the cans as the turret revolves, rotating buffers engaging the freshly-soldered seams of the cans as the cans rotate, and means for automatically delivering the cans from the solder mechanism to said turret, substantially as specified.

16. In a can-end-soldering and surplus-solder-removing machine, the combination with a solder mechanism, of a rotating turret furnished with antifriction-rollers forming pockets to receive the cans between them, an endless-belt conveyer having a looped run partially surrounding said turret for rotating the cans as the turret revolves, a rotary buffer engaging the head or bottom of the can, and a second rotary buffer engaging the side or body of the can, substantially as specified.

MEREDITH LEITCH.

Witnesses:
W. F. DUTTON,
A. R. GIBBS.